US012211373B2

(12) United States Patent
Griffiths

(10) Patent No.: US 12,211,373 B2
(45) Date of Patent: Jan. 28, 2025

(54) LASER DEVICE AND SYSTEM

(71) Applicant: Michael Griffiths, Kingston (CA)

(72) Inventor: Michael Griffiths, Kingston (CA)

(73) Assignee: Sean Michael Owen Griffiths, Ontario, CA (US)

( * ) Notice: Subject to any disclaimer, the term of this patent is extended or adjusted under 35 U.S.C. 154(b) by 0 days.

(21) Appl. No.: 18/051,771

(22) Filed: Nov. 1, 2022

(65) Prior Publication Data

US 2023/0134071 A1 May 4, 2023

Related U.S. Application Data

(60) Provisional application No. 63/274,088, filed on Nov. 1, 2021.

(51) Int. Cl.
*G08B 7/06* (2006.01)
*G08B 5/36* (2006.01)

(52) U.S. Cl.
CPC ................. *G08B 7/06* (2013.01); *G08B 5/36* (2013.01); *G08B 7/062* (2013.01)

(58) Field of Classification Search
CPC ........... G08B 7/062; G08B 7/066; G08B 5/36
See application file for complete search history.

(56) References Cited

U.S. PATENT DOCUMENTS 4,365,238 A * 12/1982 Kollin ...................... G08B 5/36 340/538.17
4,754,266 A * 6/1988 Shand ...................... A62B 3/00 340/521
5,297,011 A * 3/1994 Triunfol .............. F21V 33/0076 362/147
5,561,412 A * 10/1996 Novak ................ G08B 25/009 340/286.07
6,142,649 A * 11/2000 Beghelli ................ F21V 17/02 362/259
6,150,943 A * 11/2000 Lehman ................ G08B 7/062 340/332
6,181,251 B1 * 1/2001 Kelly ..................... G08B 17/00 362/147
8,376,567 B1 * 2/2013 Zozula ................... G08B 7/066 362/217.1
10,553,085 B1 * 2/2020 Derickson .............. G08B 7/062
10,976,794 B2 * 4/2021 Robotham ................ G06F 1/30
(Continued)

*Primary Examiner* — John A Tweel, Jr.
(74) *Attorney, Agent, or Firm* — Shumaker & Sieffert, P.A.

(57) ABSTRACT

Apparatuses, methods, and systems for identifying a target location to an occupant are provided. The apparatus comprises a laser rotatably coupled to a body of the apparatus, and at least one sensor connected to the body. The at least one sensor is configured to detect an alarm, and when the at least one sensor detects the alarm, the laser is configured to emit a laser beam to indicate a target location to an occupant. The method for identifying or indicating a target location comprises detecting, by a sensor of an apparatus, an alarm, in response to detecting the alarm, outputting, by the sensor, a signal, in response to the signal, activating a laser rotatably coupled to a body of the apparatus to identify or indicate the target location. The invention may be used for emergency situations to indicate a target location such as an exit for occupants of a building or residence.

20 Claims, 7 Drawing Sheets

(56) References Cited

U.S. PATENT DOCUMENTS

| | | | | |
|---|---|---|---|---|
| 2005/0174251 | A1* | 8/2005 | Terry, III | G08B 7/062<br>340/506 |
| 2007/0064433 | A1* | 3/2007 | Wright | H04R 1/028<br>362/364 |
| 2012/0092183 | A1* | 4/2012 | Corbett | G08B 7/066<br>340/815.4 |
| 2023/0016786 | A1* | 1/2023 | Kim | G08B 5/30 |
| 2023/0055364 | A1* | 2/2023 | Lewis | G09F 19/22 |

* cited by examiner

LASER DEVICE AND SYSTEM

RELATED APPLICATION

This application claims the benefit of U.S. Provisional Application Ser. No. 63/274,088, filed Nov. 1, 2021, the entire content of which is incorporated herein by reference.

TECHNICAL FIELD

The present disclosure relates to a laser device and system, and in particular to a laser device and system for identifying a target location.

BACKGROUND

In an emergency situation, occupants or people in a residence or building may be required to leave the building for their safety. The building or residence that they are in may be dark or filled with smoke depending on the emergency situation. An alarm system such as a smoke detector or fire alarm may go off to notify the occupant(s) that they should leave the building.

However, such an alarm system does not provide the occupant(s) with a way to exit the building. In dark or smoky situations, the occupant(s) may be unaware or may be unable to determine where the exit is to bring them to safety. This can cause additional stress for the occupant(s) in an already stressful situation.

Accordingly, an additional, alternative, and/or improved system for identifying a target location to an occupant is desired.

SUMMARY

In accordance with one aspect of the present disclosure, an apparatus is disclosed, the apparatus comprising a body, a laser rotatably coupled to the body, and at least one sensor connected to the body. The at least one sensor is configured to detect an alarm, and when the at least one sensor detects the alarm, the laser is configured emit a light to identify a target location.

In the apparatus, the laser is rotatably coupled to the body via a housing, the housing being rotatable with respect to the body, and configured to direct the laser to the target location.

In the apparatus, the body may be formed of fire resistant materials.

The apparatus may further comprise a power source and indicator for indicating when the power source is low.

In the apparatus, the laser may be configured to emit the light in accordance with sounds of the alarm.

In the apparatus, the laser may be configured to emit the light during predetermined time intervals.

The apparatus may further comprise a printed circuit board (PCB) to which the laser and the at least one sensor are connected to.

In the apparatus, the at least one sensor is a microphone configured to detect sounds of the alarm.

In accordance with another aspect of the present disclosure, a method of identifying a target location is disclosed, the method comprising detecting, by at least one sensor of an apparatus, an alarm, in response to detecting the alarm, outputting, by the at least one sensor, a signal, and in response the signal, activating a laser rotatably coupled to a body of the apparatus to identify the target location.

In the method, the signal may indicate that the alarm has been detected by the at least one sensor.

The method may further comprise activating the laser for predetermined time intervals.

In the method, the sensor detects a sound of the alarm.

The method may further comprise activating the laser during each sound of the alarm.

In accordance with another aspect of the present disclosure, a system for identifying a target location is disclosed, the system comprising at least one sensor of an apparatus for detecting an alarm, and a laser rotatably coupled to the apparatus and configured to activate in response to the at least one sensor detecting the alarm. The laser is directed to a target location, and when the laser is activated, the laser identifies the target location.

In the system, the at least one sensor is a microphone.

In the system, the at least one sensor detects a sound of the alarm.

In the system, the laser may be configured to emit the light in accordance with sounds of the alarm.

In the system, the laser may be configured to emit the light during predetermined time intervals.

The system may further comprise a power source for providing power to the apparatus, and an indicator located on the apparatus for indicating when the power source is low.

The system may further comprise a switch located on the apparatus for activating the laser.

BRIEF DESCRIPTION OF DRAWINGS

Further features and advantages of the present disclosure will become apparent from the following detailed description, taken in combination with the appended drawings, in which.

DETAILED DESCRIPTION

Apparatuses, methods, and systems for identifying a target location to an occupant are disclosed herein. The apparatus comprises a laser rotatably or pivotably coupled to a body of the apparatus, and at least one sensor connected to the body. The at least one sensor is configured to sense an alarm, and when the at least one sensor senses the alarm, the laser is configured to emit a laser beam to indicate a target location to an occupant. The method for identifying or indicating a target location comprises sensing, by a sensor of an apparatus, an alarm, outputting, by the sensor, a signal, in response to receiving the signal, activating a laser rotatably coupled to a body of the apparatus to identify or indicate the target location. It will be appreciated that the technology described in this application may be applicable to laser apparatuses or devices, such as the Laser Exit®.

Figure 1:
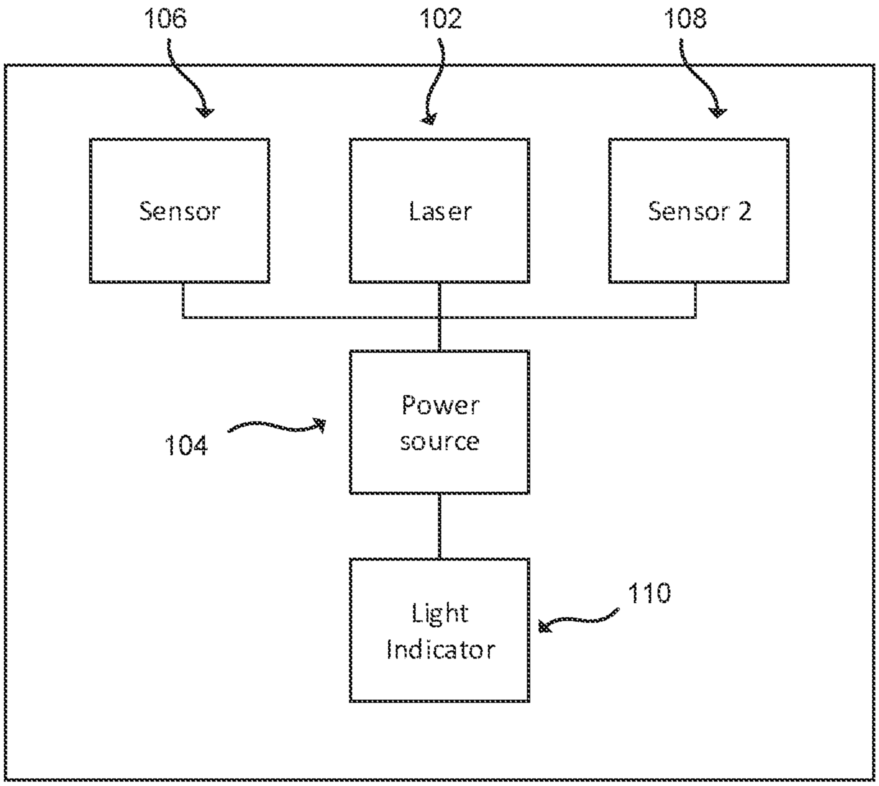
FIG. 1 depicts an embodiment of a system of the laser device.
Figure 2C:
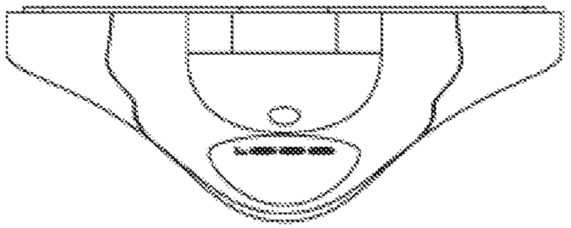
FIGS. 2A, 2B, 2C, and 2D depict front, side, top and bottom views of an embodiment of the laser device.
Figure 2B:
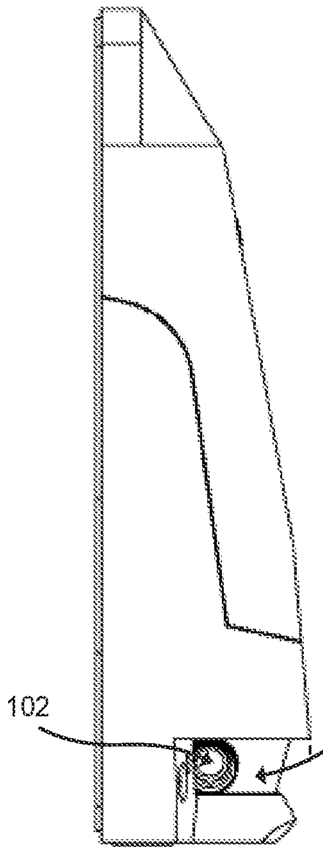
Figure 2A:
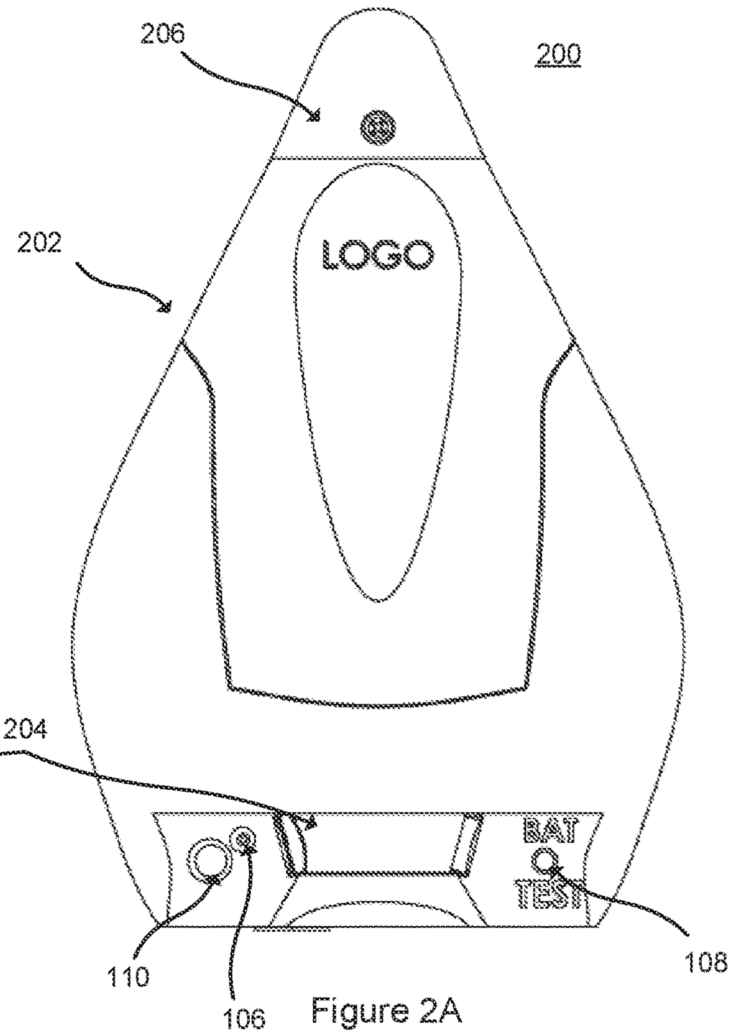
Figure 2D:
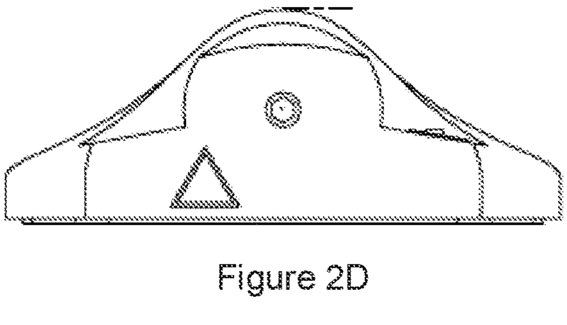

FIG. 1 depicts a system of a laser device. The system of the device may be housed within or mounted to a body of the device. The system comprises a laser 102, a power source 104, at least one sensor 106, and a second sensor or switch 108. The power source 104 provides power to the device.

The power source 104 may be a type of battery or another type of power source to allow the device to work in emergency situations where there may be no power or electricity. If the power source 104 is a battery, the battery may be a 9 volt battery that is housed in a plastic case with an on/off switch for safety if the device is mailed to a user. The system of the laser device may further comprise a small light indicator 110, such as an LED light, that will turn on to notify the user when the power source 104 is low. The device 100 may also emit an audible alarm to indicate that the power source 104 is low.

It will be appreciated that the device may additionally or instead comprise a fold out plug on a rear of the body as a power source. It will be appreciated that the laser 102 may be a class one line laser or a class two line laser that is configured to be directed to a target location. In some embodiments, the laser 102 is a laser from Qingdao Lasence Co., Ltd.

FIGS. 2A, 2B, 2C, and 2D depict front, side, top and bottom views of an embodiment of the laser device 200, respectively. The laser device 200 comprises a round, oblong, or rectangular body or housing 202. The laser device 200 comprises a laser housing 204 for the laser 102, which is rotatably coupled to a body of the device 200. The laser housing 204 may be rotatable about a vertical axis of the body of FIG. 2A. The laser housing 204 may further comprise one or more holes or openings to allow the laser 102 to point through towards the target location and/or to allow the heat of the laser 102 to dissipate from the housing 204. The target location may be any location that is to be identified for occupants or people in an area. For example, the target location may be an exit or door in a building, or may be a window or other door inside or outside of a building.

The at least one sensor 106 may be a microphone or similar type of sensor positioned adjacent to the laser housing 204. The at least one sensor 106 is configured to detect or sense an alarm signal, such as an alarm or noise from a smoke detector. The device 200 may further comprise a light indicator 110 for notifying the user when the power source is low, which may be positioned adjacent the laser housing 204, as depicted. It will be appreciated that in some embodiments, the sensor 106 and the light indicator 110 may be positioned at a different locations on the device 200 so that the sensor can reliably sense the alarm, and the user can easily identify when the power source is low. The device 200 may further comprise a switch 108 for testing the power source's strength. The switch 108 is present at a location on the device 200 such that a user can easily test the strength of the power source. The power source 104 may be covered by a cover 206 that is removably fastened to a body of the device 200.

As depicted in FIGS. 2A-2D, the laser device may have a slim design such that it does not require a lot of space on a wall or ceiling. Although, a round triangular type shape is depicted, the device 200 may instead have a dome type shape, or have a square type shape. In embodiments of the square shape, the device may comprise a square electrical cover with a slot at the bottom for the laser. The device 200 may be secured to a wall or ceiling to allow for the laser 102 to be directed to the target location. The device may be secured to the wall or ceiling of a building or residence via connection means at a back of the device 200. It will be appreciated that the outer elements of the device may be fire resistant elements, so that the device will operate and indicate an exit during an emergency situation, for example, during a fire.

Figure 3B:
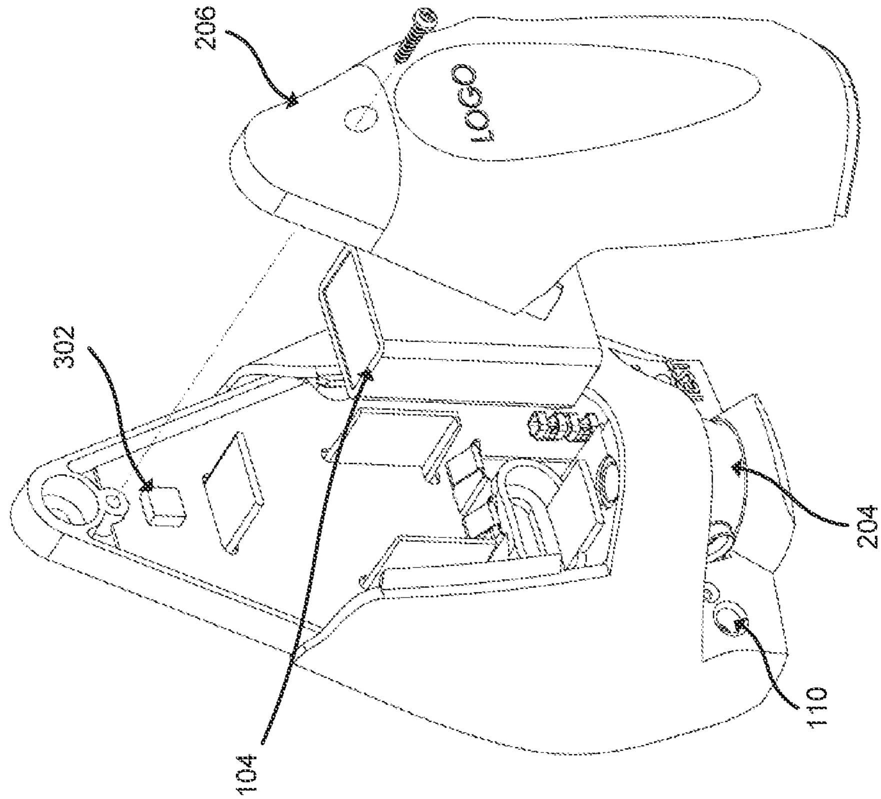
FIGS. 3A and 3B depict the laser device with the cover removed.
Figure 3A:
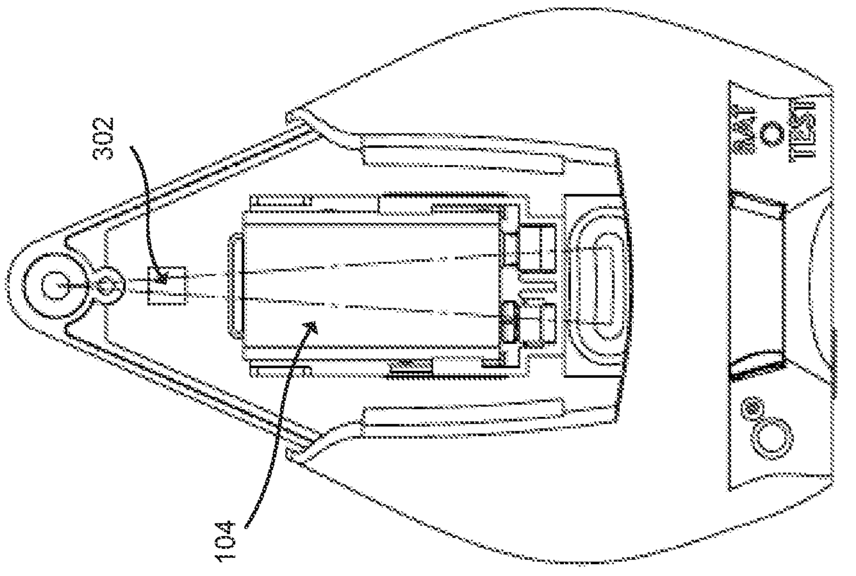

FIGS. 3A and 3B depict the laser device 200 with the cover 206 removed. As depicted, the cover 206 may cover the power source 104, such as a battery. The cover 206 is configured to open or lift to allow the battery to be changed when needed. The cover 206 may also cover the means for securing the device to the wall, and a switch 302 for testing the laser during set up. The switch 302 is configured to activate the laser 102 such that a user can use the switch 302 while setting up the device 200 to ensure that the laser 102 accurately points to the target location. Before testing the laser 102, or during or after testing the laser 102, the laser housing 204 may be moved or rotated to allow for a user to move the direction of the laser 102 such that it is directed to the target location. The laser 102 may be configured to point to a door handle of a target location, a bottom of a door or exit, or other location on the target location.

Figure 4:
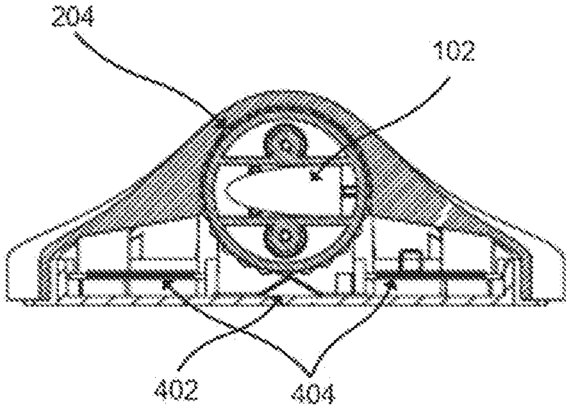
FIG. 4 depicts a cross sectional view of the laser device.

FIG. 4 depicts a cross sectional view of the laser device 200, in particular, of the laser housing 204. As depicted, the laser housing 204 may be a wheel that has ridges at an outside of the wheel. The wheel may be rotated to point the laser 102 towards the target location. Once the laser 102 is directed at the target location, the ridges of the wheel allow the wheel to be held in place. A stabilizing member 402 engages between the ridges of the wheel to prevent the wheel from moving unless the movement is forced by a user. The user may rotate the wheel in either direction to allow the laser 102 to point at the target location. The ridges and stabilizing member 402 allow for a ratchet type mechanism for the wheel. Although a ratchet type mechanism is described and depicted, another moveable or rotatable mechanism may instead be used to allow the laser 102 to point to the target location.

One or more sensors, including sensor 106, are located on a printed circuit board (PCB) 404 which is located within the device 200. The laser, switches and indicator are also present on or connected to the PCB 404 via soldering or other connection means. A body and cover of the device 200 further comprises holes or openings to allow for the elements on the PCB 404 to be accessed or visible to a user. For example, the switches and openings are positioned to be accessed by the user, the indicator and openings to be visible by the user, and the sensors and openings to sense the alarm. A Micro Processor may also be installed on the PCB to reduce the sensitivity of the microphone (not depicted).

Figure 5:
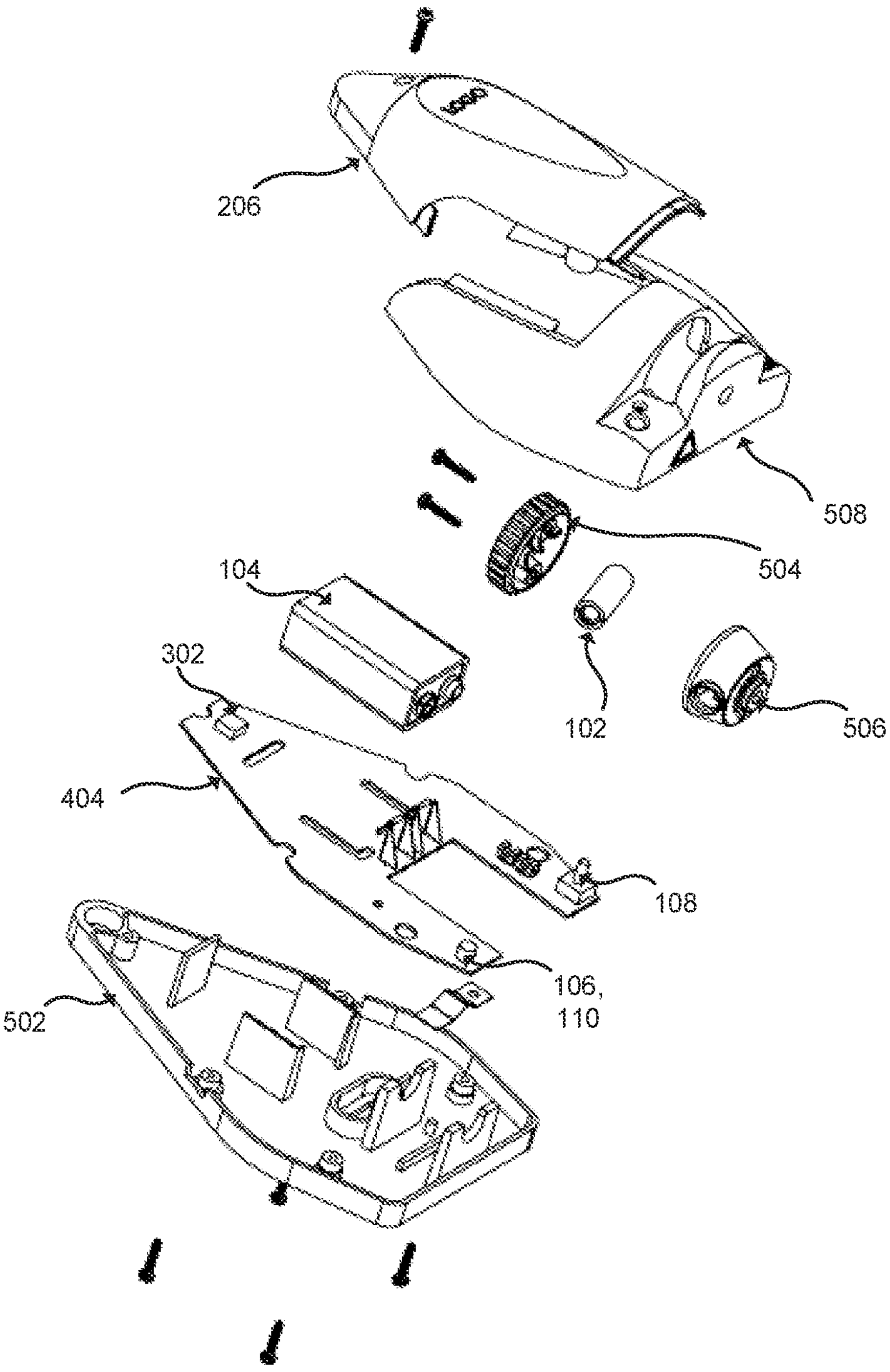
FIG. 5 depicts an exploded view of the device of FIGS. 2A-2D.

FIG. 5 depicts an exploded view of the device of FIGS. 2A-2D. The elements of the device 200 may be fastened together with screws or other fastening means by a user, or the device may be preassembled before being received by the user. The device 200 comprises a body 502 to which the PCB 404, having at least sensor 106, indicator 110, and switches 108, 302 connected thereto, is fastened or connected to. The power source 104 also connects to the PCB 404 to provide power to the device 200. The laser housing 204 comprises the wheel 504, the laser 102, and a laser cover 506, which are assembled together and rotatably coupled to the body 502. It will be appreciated that although a wheel is described and depicted for the laser housing 204, another moveable housing or assembly may instead be used to allow the laser 102 to be adjusted to point to many different directions. A body cover 508 is fastened or secured to the body 502 to protect the PCB 404 and other components. The cover 206 may then be removably fastened to the body 502, such that it may be easily removed by a user to replace the power source 104, or to test the laser 102 using switch 302.

Figure 6:
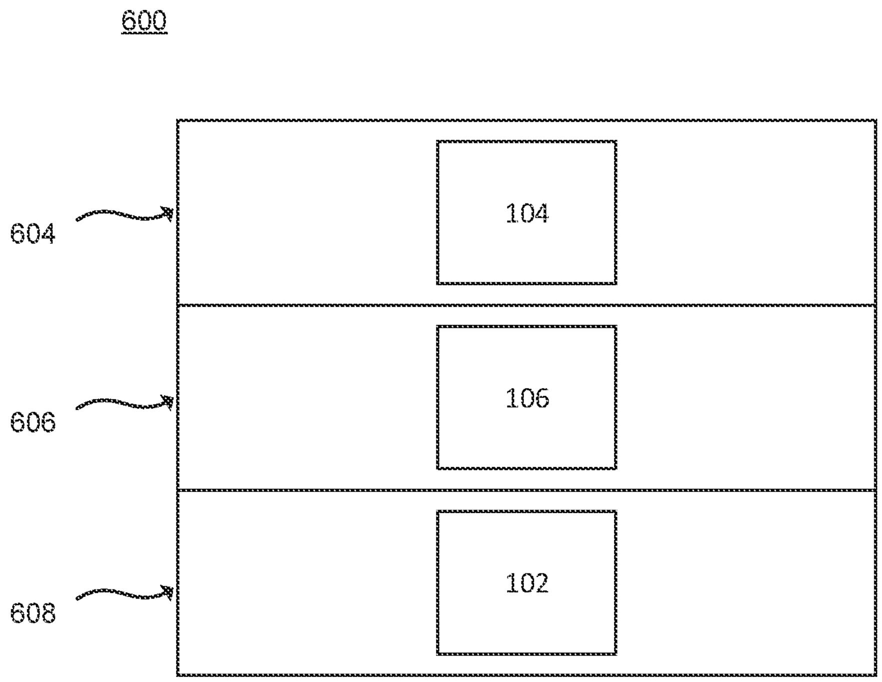
FIG. 6 an embodiment of the laser device.

FIG. 6 depicts another embodiment of a laser device 600. The laser device 600 comprises a round, oblong, or rectangular box with one or more compartments or sections. The one or more sections comprise a section 604 for the power source 104, a section 606 for the at least one sensor 106, and a section 608 for the laser 102. The section 604 for the power source 104 may be at a top of the laser device 600. In an embodiment where the power source 104 is a battery, the section 604 for the power source 104 is configured to open or lift to allow the batteries to be changed when needed. The top of the laser device 600 may further comprise one or more buttons, such as switch 108, for testing the power source's 104 strength and/or for positioning the laser 102. The switch 108 may be present at a location on the device 600 such that a user can easily test the strength of the power source. It will be appreciated that the laser device 600 may further comprise a small light indicator similar to the light indicator 110 of the laser device 200, that will turn on to notify the user when the power source 104 is low.

One or more sensors, including sensor 106, are located on a printed circuit board (PCB) which is located within the section 606. The sensor 106 may be soldered or connected to the PCB. The laser, switches and/or indicator are also present on or connected to the PCB via soldering or other connection means. The section 606 for the sensor 106 may be positioned below the section 604. The section 606 may further comprise holes or openings at a front of the section 606 to allow for the sensor 106 to sense the noise of an alarm.

The section 608 for the laser 102 may be positioned below the section 606, and comprises the laser 102. The section 608 may act as a laser housing that is set on an angle so as to direct the laser 102 towards the target location. It will be appreciated that the section for the laser 102 may be moveable to set the appropriate angle for the laser 102, for example, the section 608 may be rotatable and/or may be pivotable to ensure the laser 102 is directed at the target location. The section for the laser 102 may further comprise one or more holes or openings at a front or side to allow the laser 102 to point through towards the target location and/or to allow the heat of the laser 102 to dissipate from the section 608. The section 608, or other section of device 600 may further comprise a switch, similar to switch 302 for testing the laser during set up. The switch is configured to activate the laser 102 such that a user can use the switch while setting up the device 600 to ensure that the laser 102 accurately points to the target location.

Although, the sections are depicted in a particular order, the sections or compartments 604, 606, and 608 may instead be placed in a different order or in another orientation. The cover of the laser device 600 may have a square type shape as depicted, or may have an oblong or rectangular shape. In embodiments, where the device 600 has a square shape, the device 600 comprises a square electrical cover with a slot at the bottom, in section 608, for the laser. The device 600 may be secured to a wall or ceiling to allow for the laser 102 to be directed to the target location. The device may be secured to the wall or ceiling of a building or residence via connection means at a top of section 604, or at another surface of the device 600 such that the laser 102 can be directed to the target location. It will be appreciated that the outer elements of the device may be fire resistant elements, so that the device will operate and indicate an exit during an emergency situation, for example, during a fire.

It will be appreciated that the device 200, 600 may further comprise a direct hook up, a voltage regulator, and/or an internal smoke detector (not depicted).

The laser 102 of the device 200, 600 may be configured to emit a laser beam in conjunction with a fire alarm, smoke detector, or other alarm system. This allows an exit or another target location to be identified for occupants of a residence or building during an emergency situation. The laser device 200, 600 may be configured to emit the laser beam when the alarm sounds its alarm in response to detecting smoke. Depending on the emergency situation, it may be dark or smoky in the building, and/or the occupant(s) may be stressed or confused in response to hearing the alarm. The laser beam emitted from the laser device 200, 600 is visible in many different conditions and can make it clear for an occupant where the exit or target location is. For example, the laser 102 may emit a green or red coloured laser beam that is visible in the dark and through smoke. It will be appreciated that the laser 102 may emit a laser beam of another colour that is still visible in the dark and through smoke, and that can identify a target location for the occupant(s). The laser beam will indicate the location of an exit or target location for the occupant or people in the residence or building to go towards. This allows for a safe exit from the residence or building in an emergency. In some embodiments, the laser beam is configured to point to the floor near a target location or exit. It will be appreciated that near the floor, there may be the thinnest covering of smoke, making the laser beam more visible. It will be further appreciated that the laser beam may reach up to approximately 24 feet.

To emit the laser beam in conjunction with the smoke detector system or other alarm system, the laser device 200, 600 comprises the at least one sensor 106. The sensor 106 may be a microphone or other sound sensor that is configured to sense the sound of the smoke detector. The sensor 106 is configured to output a positive voltage, in response to sensing the sound of the smoke detector or other alarm, which can activate the laser 102. The laser 102 may be activated with each beep or sound of the smoke detector such that the laser beam is emitted only while the alarm is making the sound or beep. The intermittent blinking of the laser beam allows for a safer environment for the occupant(s) should they inadvertently look towards the laser 102 during an emergency situation. It will be appreciated that other lengths of intermittent blinking or longer or shorter lengths of emitting the laser beam may instead be configured for the laser device 200, 600. In some embodiments, the laser 102 is a class two safety laser that will not damage the occupant(s) eyes should they inadvertently look at the laser beam.

As described above, the laser device 200, 600 may be mounted to a wall or ceiling, or other element in a building or residence. The device may be mounted at least 2 feet above the floor on a ceiling, wall, or other element. Once the laser device 200, 600 is placed and secured to the ceiling, wall or other element, the direction of the laser 102 is adjustable via the laser housing, section 608, or other rotatable elements, manually or using an automated system. In some embodiments, the device 200, 600 may be secured to a wall or ceiling using an easy mounting bracket which may allow the device 200, 600 to turn up to 180 degrees once mounted to the wall or ceiling. To verify that the laser will point to the target location, the laser device 200, 600 further comprises the sensor or switch 302 which may be a button or switch allowing for directional setup. The user can activate the laser 102 using the sensor 302 to emit a laser beam so that they can ensure the laser beam is pointed towards the target location.

Figure 7:
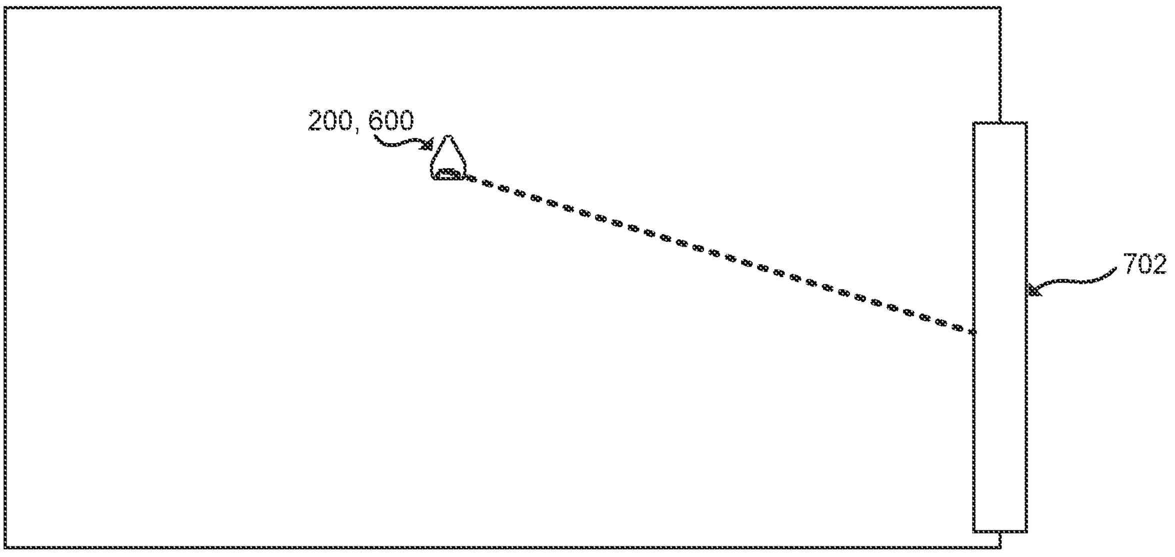
FIG. 7 depicts an embodiment of the laser device in use.

FIG. 7 depicts a laser device 200, 600 in use. The laser device may be mounted or attached to a wall, as depicted, or may be attached to a ceiling or other element near a target location 702. The laser beam from the laser device is directed to point at the target location 702 using the moveable means in the laser device 200, 600. The laser device 200, 600 may be configured to point the laser beam to a particular place on the target location 702, or to the floor in front of the target location 702. For example, if the target location 702 is a door, the laser beam may point to a place near the door handle or at the floor in front of the door. In a case where the target location 702 is a patio door or door with windows, a small target or marker may be placed on the door to prevent the laser beam from passing through the glass of the target location 702. The small target or marker may be white in colour and can be fitted to the glass of the door as target for the laser beam. In embodiments where the laser beam is directed towards the floor, the laser beam may also illuminate the target location 702 depending on the distance of laser device from the target location 702. For example, the laser beam may be directed to the floor and may illuminate the door handle and lock of the target location 702, or may run along the floor and up a door or window to show the target location.

As depicted in FIG. 7, the laser device 200, 600 may be placed in close proximity to the target location 702 to direct the laser beam to the target location 702. It will be appreciated that the laser device may be placed further from the target location or closer to the target location so long as the laser beam can accurately point towards the target location or floor without obstructions. In some embodiments, the body of the device 200, 600 may be configured as a type of echo chamber. This allows the device to be positioned at a more distant position from the smoke detector or fire alarm, as smoke detectors may emit 110 to 125 decibels. The closer the device is to the smoke detector or fire alarm, the louder the beep or sound of the smoke detector will be for the sensor. In some embodiments, the device 200, 600 may comprise holes or openings to allow the device to be positioned at a more distant position from the smoke detector or fire alarm, as the sound will travel through the holes or openings to the sensor 106. It will be appreciated that the laser device may be placed in close proximity to the smoke detector or other alarm system depending on the layout of the building or residence.

As described above, the described laser devices and system may be useful in buildings during emergency situations, where there may be smoke or other poor visibility conditions. The device and systems can be used when there may not be any power or electricity and can allow for an exit or other location to be clearly identified for an occupant in the building, to help them get to safety during a fire or other emergency situation.

It will be apparent to persons skilled in the art that a number of variations and modifications can be made without departing from the scope of the invention. Although specific embodiments are described herein, it will be appreciated that modifications may be made to the embodiments without departing from the scope of the current teachings. For simplicity and clarity of the illustration, elements in the figures are not necessarily to scale, are only schematic and are non-limiting of the elements structures. It will be apparent to persons skilled in the art that a number of variations and modifications can be made without departing from the scope of the invention as described herein.

The invention claimed is:

1. An apparatus comprising:

a body;

a laser rotatably coupled to the body via a housing, the housing being rotatable with respect to the body, and comprising a wheel configured to rotate the housing as to direct the laser to a target location; and at least one sensor connected to the body;

wherein the at least one sensor is configured to detect an alarm based on sounds of the alarm, and when the at least one sensor detects the alarm, the laser is configured to emit a laser beam for a duration of the alarm to the target location in order to identify the target location, and wherein the laser beam is emitted intermittently and each emission of the laser beam corresponds to each sound of the alarm.

2. The apparatus of claim 1, wherein the body is formed of fire resistant materials.

3. The apparatus of claim 1, further comprising a power source and an indicator for indicating when the power source is low.

4. The apparatus of claim 1, wherein each emission of the laser beam is for a predetermined time.

5. The apparatus of claim 1, further comprising a printed circuit board (PCB) to which the laser and the at least one sensor are connected to.

6. The apparatus of claim 1, wherein the at least one sensor is a microphone configured to detect the sounds of the alarm.

7. The apparatus of claim 1, wherein the wheel comprises ridges configured to engage with a stabilizing member as to secure the housing in place.

8. The apparatus of claim 1, wherein the housing is rotatable about a vertical axis of the body.

9. A method of identifying a target location, the method comprising:

detecting, by at least one sensor of an apparatus, an alarm based on sounds of the alarm;

in response to detecting the alarm, outputting, by the at least one sensor, a signal; and in response the signal, activating a laser rotatably coupled to a body of the apparatus via a housing rotatable with respect to the body to emit a laser beam for a duration of the alarm to the target location in order to identify the target location, wherein the laser beam is emitted intermittently and each emission of the laser beam corresponds to each sound of the alarm; and wherein the housing comprises a wheel for rotating the housing as to direct the laser to the target location.

10. The method of claim 9, wherein the signal indicates that the alarm has been detected by the at least one sensor.

11. The method of claim 9, wherein each emission of the laser is for a predetermined time.

12. The method of claim 9, wherein the wheel comprises ridges configured to engage with a stabilizing member as to secure the housing in place.

13. The method of claim 9, further comprising: rotating the housing via the wheel to direct the laser to the target location.

14. A system for identifying a target location, the system comprising:

at least one sensor of an apparatus for detecting an alarm based on sounds of the alarm; and a laser rotatably coupled to the apparatus via a housing rotatable with respect to a body of the apparatus and configured to be activated in response to the at least one sensor detecting the alarm;

wherein the laser is directed to a target location, and wherein the laser is configured to emit a laser beam for a duration of the alarm to the target location in order to identify the target location when the laser is activated;

wherein the laser beam is emitted intermittently and each emission of the laser beam corresponds to each sound of the alarm; and wherein the housing comprises a wheel for rotating the housing as to direct the laser to the target location.

15. The system of claim 14, wherein the at least one sensor is a microphone.

16. The system of claim 14, wherein each emission of the laser beam is for a predetermined time intervals.

17. The system of claim 14, further comprising:

a power source for providing power to the apparatus; and an indicator located on the apparatus for indicating when the power source is low.

18. The system of claim 14, further comprising a switch located on the apparatus for activating the laser.

19. The system of claim 14, wherein the wheel comprises ridges configured to engage with a stabilizing member as to secure the housing in place.

20. The system of claim 14, wherein the housing is rotatable about a vertical axis of the body.

* * * * *